United States Patent [19]
Baroni et al.

[11] Patent Number: 5,330,733
[45] Date of Patent: Jul. 19, 1994

[54] METHOD FOR REMOVING POLLUTANTS FROM A COMBUSTION GAS

[75] Inventors: Alessandro Baroni; Luigi Civitano; Omero Sguerri, all of Pisa, Italy

[73] Assignee: Enel-Ente Nazionale per l'Energia Elettrica, Rome, Italy

[21] Appl. No.: 902,254

[22] Filed: Jun. 22, 1992

[30] Foreign Application Priority Data

Sep. 19, 1991 [IT] Italy .................. MI91A002482

[51] Int. Cl.$^5$ ............... C01B 21/00; C01B 17/00; C01C 1/18; C01C 1/24
[52] U.S. Cl. ............... 423/235; 423/243.06; 423/396; 423/545; 204/157.46
[58] Field of Search ............ 423/244.07, 244.08, 423/235, 235 D, 545, 396, 243.06; 204/157.46

[56] References Cited

U.S. PATENT DOCUMENTS

| | | | |
|---|---|---|---|
| 4,004,995 | 1/1977 | Machi et al. | 423/235 |
| 4,454,100 | 6/1984 | Faatz | 423/235 |
| 4,562,053 | 12/1985 | Andersson | 423/235 |
| 4,585,631 | 4/1986 | Pfeiffer | 423/235 |
| 4,995,955 | 2/1991 | Kim et al. | 423/235 |
| 5,041,271 | 8/1991 | Aoki et al. | 423/235 |

Primary Examiner—Gregory A. Heller
Attorney, Agent, or Firm—Keil & Weinkauf

[57] ABSTRACT

A combustion gas is cooled a first time to about 110° C. in a first cooling chamber (3), up to 90% of the ashes is removed in a first precipitator (9) then the gas is cooled again in a second cooling chamber (10), to about 80° C.; in a reaction chamber (13), by energization by means of electrons the sulphur dioxide and nitrogen oxides are converted into sulphuric acid and nitric acid and, with the addition of dry ammonia (15) the two said acids are converted to salts of ammonia, the latter are retained in a second precipitator (21) and sent to a chimney; characteristics of the method and the plant are that, from the instant of the injection of the ammonia into the reaction chamber (13), the temperature of the gas is maintained at above 80° C. to reduce the thermochemical conversion of the sulphur dioxide to acidic sulphites and sulphates and that in a subsequent injection chamber (16) hydrogen peroxide is injected into the gas to convert the residual sulphur dioxide into sulphuric acid which, reacting with the ammonia, produces ammonia salts (FIG. 1).

1 Claim, 1 Drawing Sheet

METHOD FOR REMOVING POLLUTANTS FROM A COMBUSTION GAS

The present invention concerns a method and plant for removing pollutants from a combustion gas of post-combustion type, in particular, for removing sulphur dioxide ($SO_2$) and nitrogen oxides ($NO_x$).

Generally, in said types of plant the removal of sulphur dioxide occurs by means of thermo-chemical reactions, even in the absence of energy transfer to the gas, and radical reactions in the presence of energy transfer to the gas.

There are noted post-combustion methods and plants, among which, systems that apply the technology of selective catalytic reduction of nitrogen oxides by means of the injection of ammonia ($NH_3$), and systems for the removal of nitrogen and sulphur oxides, following the reduction of ammonia and by means of energy transfer to the combustion gas; with the latter systems, in general, first an interaction between the gas and electrons of appropriate energy is caused in order to transform the sulphur dioxide and nitrogen oxides respectively into sulphuric acid ($H_2SO_4$) and nitric acid ($HNO_3$), then there is an intake of ammonia to reduce said acids to ammonia salts and lastly a removal of said salts in an electrostatic precipitator and/or Bag Filter system. The methods and plants cited above offer a good degree of reduction of nitrogen oxides but bear the disadvantages of high costs, limited duration, leakage of ammonia into the atmosphere and high load losses in the gas circuit. There are also noted post-combustion wet "scrubber" methods and plants which present the difficulty of discharging the solution and/or the sludge containing sulphates and nitrates and the necessity of heating the combustion gas before passing it into the atmosphere.

In the following description the 'combustion gas' is referred to simply as 'gas'.

The invented method and plant, as characterised in the claims, obviate the greater part the above cited drawbacks.

The method comprises in sequence the phases of:
a) intake of the gas and cooling it to about 110° C. with atomised water in at least a first cooling chamber or in the gas transport duct.
b) removing up to around 90% of the light ashes present in the gas in at least a first electrostatic precipitator.
c) further cooling of the gas to bring the temperature to about 80° C.
d) in at least a second reaction chamber, in which dry ammonia is added to the gas, at the same time energising the gas by means of voltage pulses so as to produce the radicals in the gas and consequently the radical reactions necessary for the removal of the nitrogen and sulphur oxides; owing to the energisation, the average temperature of the gas in said second chamber reaches a value of about 100° C. and therefore the thermo-chemical conversion of sulphur dioxide to partially acidic sulphites and sulphates is reduced;
e) in at least one injection chamber, injecting a solution of hydrogen peroxide into the gas to convert the sulphur dioxide residue into sulphuric acid which reacts with the ammonia producing ammonium sulphate; the concentration of hydrogen peroxide in the fumes stays in the region of 0.7 times the concentration of the $SO_2$ present at the entrance of the plant;
f) possibly, in at least one second electrostatic precipitator, retain said ammonium sulphate;
g) in at least one filtration chamber, equipped with suitable filters, cause chemical reactions in heterogeneous phase to improve the removal of nitrogen oxides.

The plant comprises:
i) a cooling chamber provided with means to inject atomised water into the gas in transit in order to lower the temperature of the gas to about 110° C.;
ii) at least a first electrostatic precipitator to remove up to 90% of the light ashes from the gas in transit;
iii) a cooling chamber to lower the temperature of the gas to about 80° C.;
iv) at least one reaction chamber that is similar to a wired plate electrostatic precipitator, this being supplied with a positive impulsive voltage of adjustable repetition frequency, and being provided with means to inject dry ammonia into the gas in transit; inside the reaction chamber the radicals necessary for the conversion of the nitrogen and sulphur oxides are produced by means of electrons generated by the impulsive electric fields; owing to the temperature of the gas on entering being greater than 80° C. and the transfer of energy to the gas, the average temperature of the gas in that reaction chamber is brought to 100° C. and therefore the thermo-chemical conversion of sulphur dioxide to partially acidic sulphates and sulphites is reduced.
v) at least an injection chamber provided with means for injecting atomised hydrogen peroxide in solution into the gas in transit to convert the residual sulphur dioxide into sulphuric acid, and to produce ammonium sulphate;
vi) at least a second electrostatic precipitator to retain said ammonium sulphate;
vii) possibly, at least one filtration chamber equipped with bag filters lined with suitable material featuring high specific surface to aid heterogeneous phase chemical reactions in, and improve the removal of the nitrogen oxides from, the gas in transit;
viii) an aspirating-pressing fan positioned upstream of the chimney and functioning at lower pressure than that of the external environment.

The main advantages of the invention are its strong reduction of the ammonia leakage, up to values of less than 1 ppmV (parts per million by volume) and in the removal of more than 99% of the sulphur dioxide. One way of implementing the invention is described in detail as follows, with reference as an example to

Figure 1:
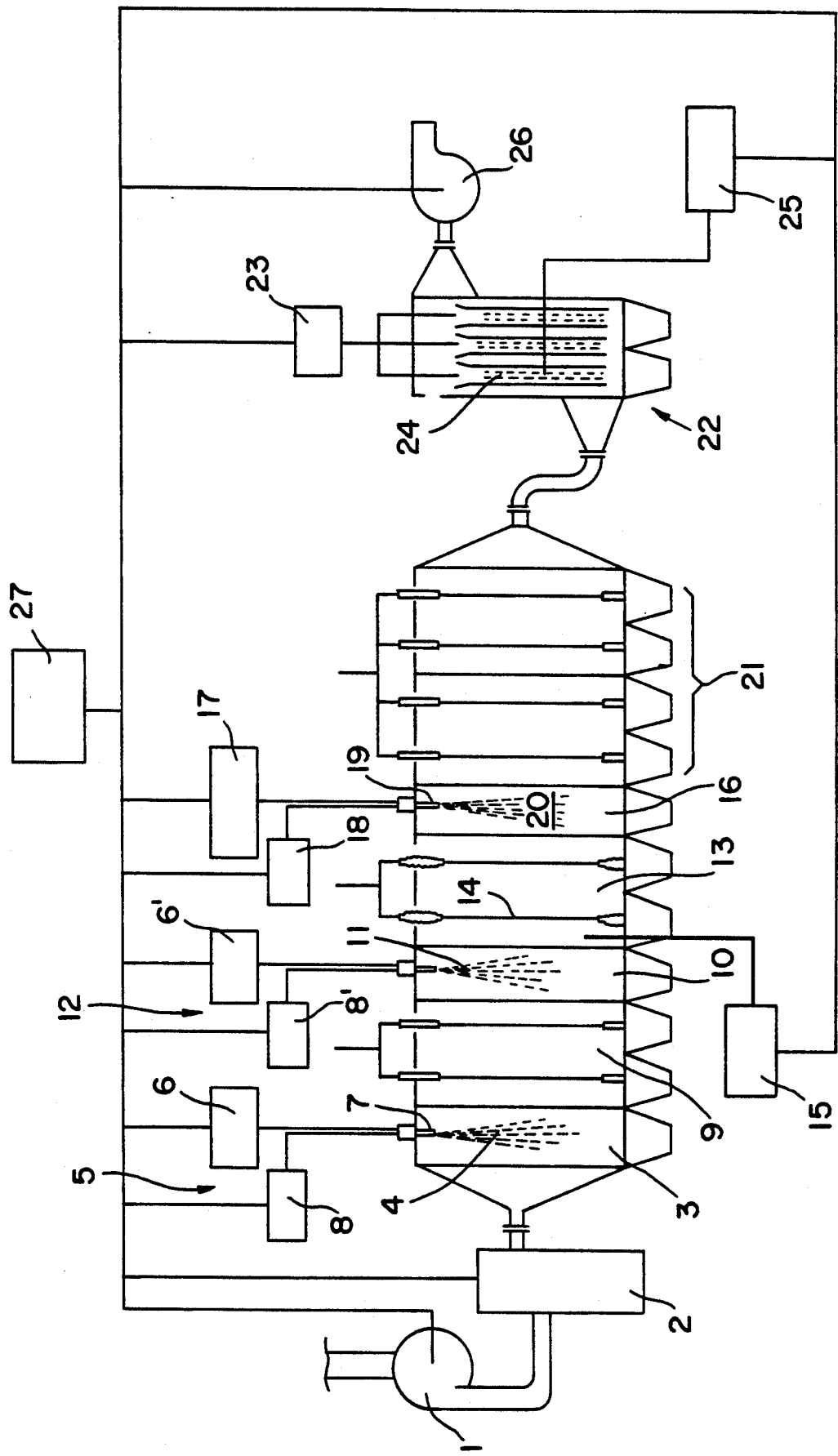
FIG. 1 which is the drawing of a specific implementation.

The figure shows:
a fan 1 that aspirates the gas from a boiler (not shown), in which American coal is burnt;
an exchanger 2 in which the combustion gas reaches temperatures of 140° C.–150° C.;
a first cooling chamber 3 in which the gas is cooled to about 110° C. by a continuous jet of atomised water 4 obtained by a unit 5 comprising: a source of water 6 and atomisers 7 assisted by compressed air 8 (obviously comprising, a variable flow pump, a regulator valve, a flow meter and valves, not shown);
a first electrostatic precipitator 9 to remove up to 90% of the light ashes from the gas;

a second cooling chamber 10 in which the gas is cooled to about 80° C. by a jet of atomised water 11 obtained by means of a unit 12, this also comprising a water source 6' and a source of compressed air 8';

a reaction chamber 13 constituted by an electrode structure similar to that of an electrostatic precipitator, that is comprising a series of earthed parallel plates (not shown) inter-leaved with a series of frames that carry wires 14 supplied with a positive impulsive voltage from 70 to 100 kV with a repetition frequency of the impulses controllable in the field 30–300 impulses per second to transfer sufficient energy to the gas to remove the required percentage of nitrogen oxides, such reaction chamber being associated with a system 15 suitable for adding dry ammonia to the same chamber and, therefore, comprising a source of ammonia in cylinders, suitable pressure reducers, a regulator valve, "on-off" valves, a device for heating the ammonia, and a source of compressed air to mix the ammonia;

an injection chamber 16 associated with a source of hydrogen peroxide 17 and a source of compressed air 18 in such a way that by means of a nozzle 19 atomised hydrogen peroxide 20 will be injected into the reaction chamber to convert the sulphur dioxide residue into sulphuric acid that, reacting with the ammonia residue, produces ammonium sulphate;

a unit of four electrostatic precipitators 21 that retains the ammonia salts, above all the ammonium sulphate that is formed following the removal of the oxide pollutants;

a bag filter unit 22 associated with a pneumatic system 23 suitable for blowing diatomite onto the external surface of the filters and a source of compressed air to wash the same filters;

an aspirating-pressing fan 26 is fitted into the plant, upstream of a chimney (not shown);

a control centre 27 to control the course of the entire process in the plant, in particular, according to the method, to control the temperature of the gas in the reaction chambers as a function of the rate of flow of the gas, of the temperature reached by the gas in the cooling chambers, and to control the quantity of the hydrogen peroxide to be injected into the injection chamber.

We claim:

1. A method for removing pollutants from a combustion gas taken from a boiler plant, which combustion gas contains light ashes, sulphur dioxide and nitrogen oxides as pollutants, which comprises: cooling the combustion gas in a heat exchanger to about 110° C.; removing at least most of the light ashes from the combustion gas in at least one electrostatic precipitator; energizing the combustion gas by means of electrons generated by impulsive electric fields to convert most of the sulphur dioxide and the nitrogen oxides into sulfuric acid and nitric acid, respectively, with the presence of residual sulphur dioxide; adding dry ammonia prepared in a gas environment and stored at a temperature of about 100° C. to the combustion gas to convert the sulfuric acids and nitric acids into the ammonium salts of these acids, producing a combustion gas containing ammonium sulphate, ammonium nitrate, sulphur dioxide, and ammonia; introducing hydrogen peroxide into the combustion gas to convert the residual sulphur dioxide into sulfuric acid, which reacts with the ammonia to produce ammonium sulphate; removing the ammonium salts from the combustion gas in an electrostatic precipitator; and passing the combustion gas to a chimney.

* * * * *